United States Patent [19]

Lehto

[11] 4,268,135
[45] May 19, 1981

[54] IMAGE FOCUSING APPARATUS

[75] Inventor: Eino M. Lehto, Juneau, Wis.

[73] Assignee: Bell & Howell Company, Chicago, Ill.

[21] Appl. No.: 79,419

[22] Filed: Sep. 27, 1979

[51] Int. Cl.³ .............................................. G03B 3/10
[52] U.S. Cl. .................................. 353/27 R; 353/74; 353/101
[58] Field of Search .................. 353/27 R, 78, 77, 74, 353/101

[56] References Cited

U.S. PATENT DOCUMENTS

| | | | |
|---|---|---|---|
| 3,224,326 | 12/1965 | Brownscombe | 353/27 R |
| 3,634,005 | 1/1972 | Peters et al. | 353/27 R |
| 4,110,020 | 8/1978 | Johnson et al. | 353/27 R |

Primary Examiner—Steven L. Stephan
Attorney, Agent, or Firm—Alan B. Samlan; Alan H. Haggard; Howard B. Rockman

[57] ABSTRACT

An image focusing apparatus for microfiche film readers and other optical systems has a lens holding apparatus which rests on a transparent or glass plate, a rotatable lens adjusting assembly in the lens holding apparatus, a shaft slidably and pivotally connected to the lens adjusting assembly, a knob on the shaft, and a shaft holder which fixes the position of the shaft with respect to the reader. The lens holding apparatus is universally mounted to the frame of the reader to enable the lens holding apparatus to move freely in response to changes in the angular disposition of the glass plate with respect to the horizontal plane. The lens adjusting assembly has an eccentric finger which translates the rotating motion of the knob and shaft into a vertical force, which moves the lens. The lens adjusting assembly has a barrel, a socket in the barrel and key slots along the socket. The shaft has a partially-spherical end and keys which slidably and pivotally fit into the socket and key slots. The simultaneous slidable and pivotal operative connection of the shaft to the lens adjusting assembly enables the operator to adjust the lens regardless of the angular disposition of the lens adjusting assembly with respect to the shaft. The connection also enables the lens holding apparatus to move freely in response to changes in the attitude of the glass plate with respect to the lens.

8 Claims, 8 Drawing Figures

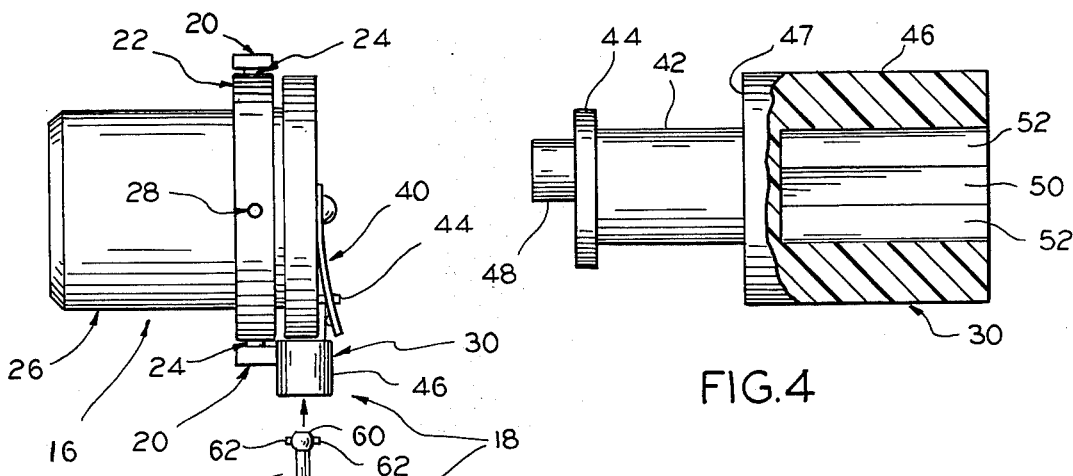
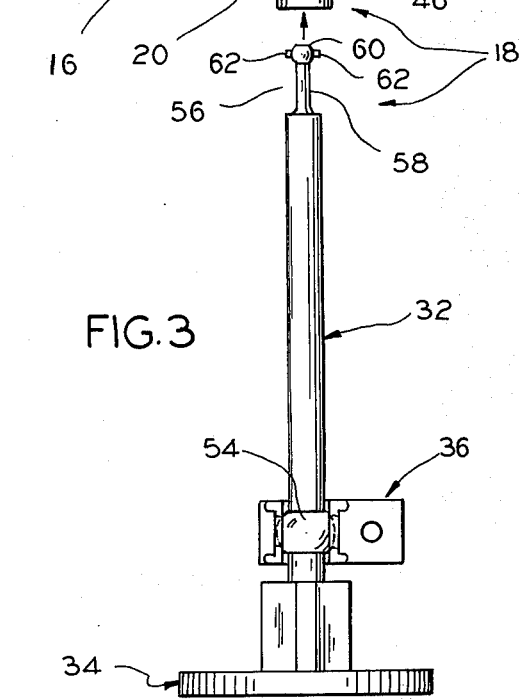
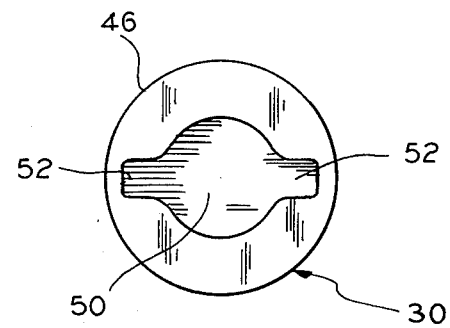
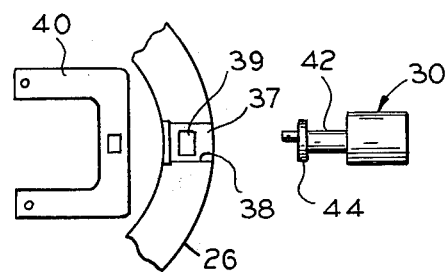
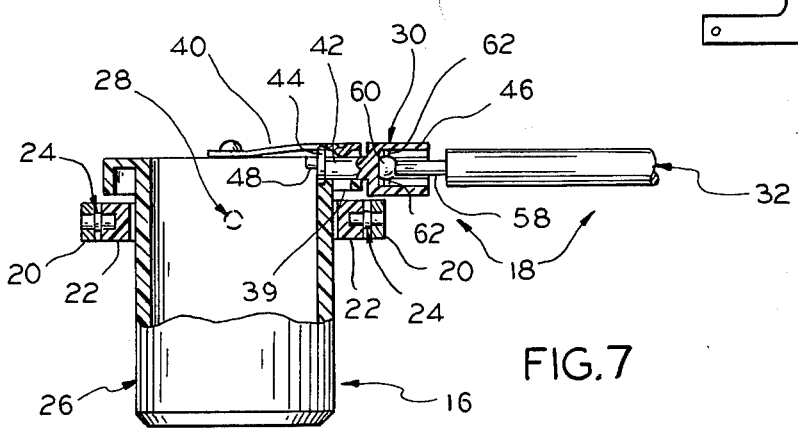

IMAGE FOCUSING APPARATUS

This invention relates to an image focusing apparatus for microfiche film readers and other optical systems, and more particularly to an adjustable image focusing apparatus for microfiche film readers in which the lens holding mechanism is universally mounted to enable the lens to move in any direction relative to the frame of the reader.

BACKGROUND OF THE INVENTION

Microfiche film systems have enjoyed tremendous success in the marketplace because with these systems a great quantity of information may be stored on a relatively small piece of flat film and retrieved easily with the use of a film reader. In most systems, an image of documentary information is reduced in size by photographic techniques and reproduced on a sheet of film. To retrieve the information, the film sheet is usually placed beneath a glass plate in a reader. A lens located over the glass plate magnifies the image, and a light projects the magnified image on to a screen. To retrieve other information on the film, the operator moves the glass plate and film beneath the lens to another part of the film area.

It is usually necessary to focus the image each time a new sheet of film is placed beneath the glass plate, and each time the glass plate is moved, due to inherent irregularities in the manufacture of the microfilm reader and the upper surface of the glass plate on which the lens housing rides. Re-focusing is generally accomplished by adjusting the lens in the vertical direction with respect to the film and glass plate.

To properly focus the image, the lens must lie flat on the surface of the glass plate. If the glass plate rises or dips even slightly, the lens must be re-adjusted for the change in attitude. To accomplish this, the lens housing is typically universally mounted on gimbals, such as those described in U.S. Pat. No. 3,634,005. The gimbals enable the lens housing to adjust to changes in the attitude of the surface of the glass plate as the plate is moved from location to location by permitting pivotal movement of the lens in any direction in the horizontal plane defined generally by the top surface of the glass plate.

Generally, apparatus for adjusting the lens vertically includes, among other things, a shaft fixed to the frame of the reader and a knob attached to the shaft along an outside edge of the frame which enable the operator to conveniently adjust the lens to focus the image. However, the operator must be able to adjust the lens regardless of the attitude of the lens with respect to the horizontal plane. Also, movement of the lens with respect to the horizontal plane must not be appreciably impaired by the lens adjusting apparatus, or the advantages gained through the use of the universal mounting may be lost. Thus, there is a need for image focusing apparatus which functions properly when the lens tilts in various directions, without appreciably impairing the movement of the lens.

Accordingly, an object of the present invention is to provide new and improved image focusing assemblies for microfiche film readers and other optical systems.

Another object is to provide new and improved image focusing apparatus for microfiche film readers in which the lens holding mechanism is universally mounted, such as on gimbals, and the image focusing apparatus does not interfere with the action of the gimbals.

Yet another object is to provide new and improved image focusing assemblies which are inexpensive to manufacture and assemble.

Still another object is to provide a new and improved image focusing apparatus which is operable over a range of lens angles with respect to the horizontal plane.

In keeping with one aspect of the present invention, an image focusing apparatus for microfiche film readers and other optical systems having a lens holding apparatus with a universal mounting is provided which has a lens-adjusting assembly in the lens holding apparatus, a shaft simultaneously slidably and pivotally connected to the lens adjusting assembly, a knob on the shaft, and a shaft holder which holds the shaft with respect to the reader. The lens may be adjusted vertically by turning the knob regardless of the angular disposition of the lens-adjusting device with respect to the shaft.

These and other advantages of the present invention, and the manner of obtaining them, will become more apparent, and the invention itself will be best understood by reference to the following description of an embodiment of the invention taken in conjunction with the accompanying drawings, in which:

FIG. 3 is a partially exploded view of the image-focusing apparatus of the microfiche film reader of FIG. 1;

FIG. 4 is a partially cutaway side elevation view of the lens adjusting device of the image focusing apparatus of FIG. 3;

FIG. 5 is an end elevation view of the lens adjusting device of the image focusing apparatus of FIG. 4.

FIG. 7 is a partially cutaway side elevation view of the image focusing apparatus of FIG. 3, and FIG. 8 is an exploded plan view of the lens holding cylinder and lens adjusting device of the image focusing apparatus of FIG. 7.

DETAILED DESCRIPTION OF THE PREFERRED EMBODIMENT

Figure 1:
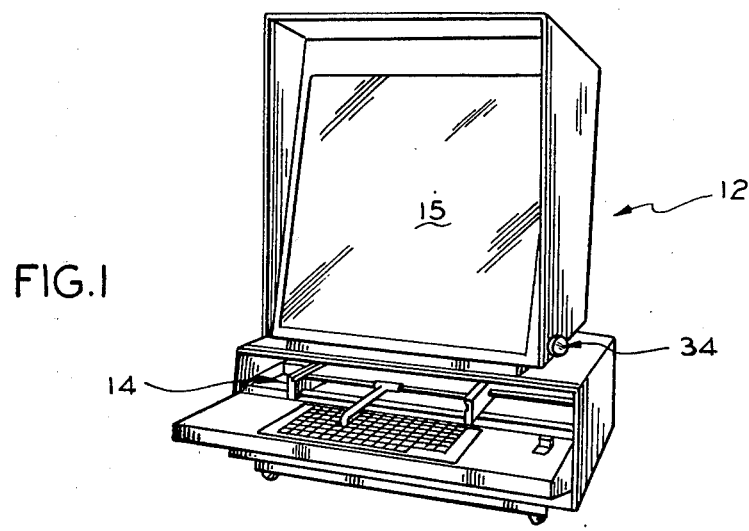
FIG. 1 is a perspective view of a microfiche film reader.
Figure 2:
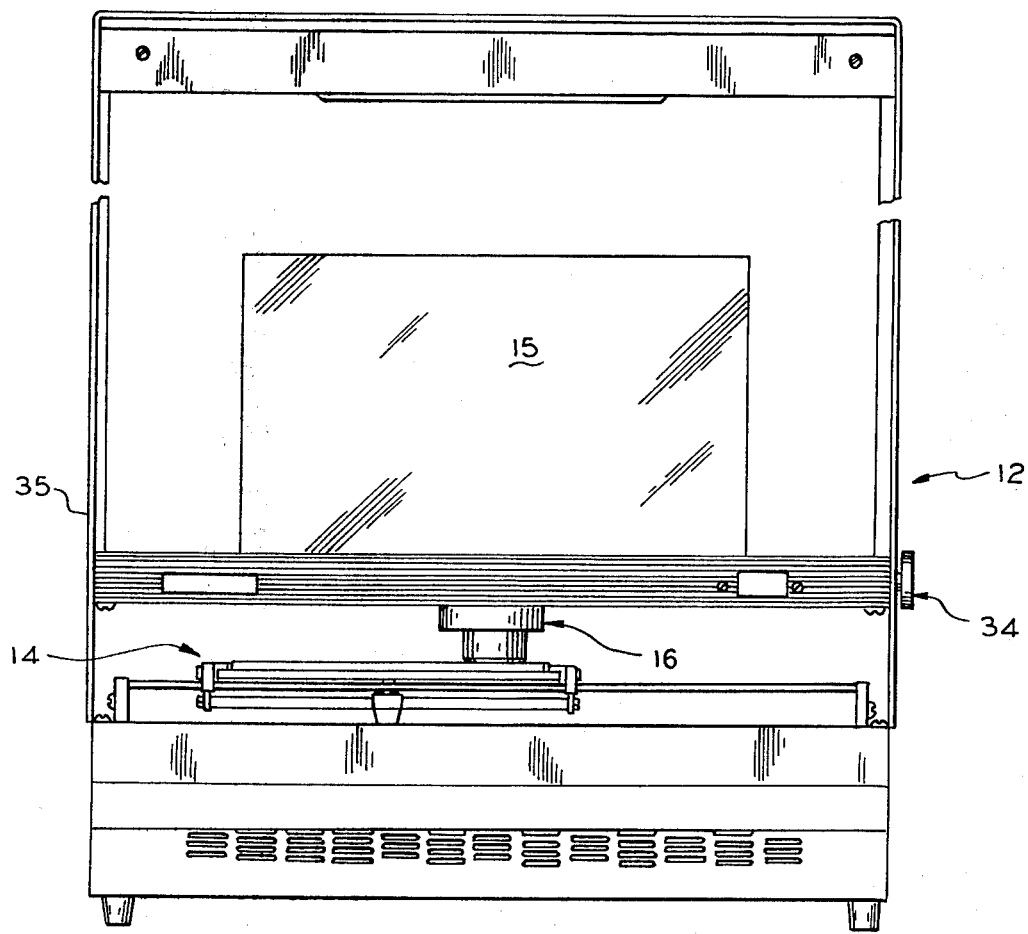
FIG. 2 is a front elevation view of the microfiche film reader of FIG. 1.
Figure 6:
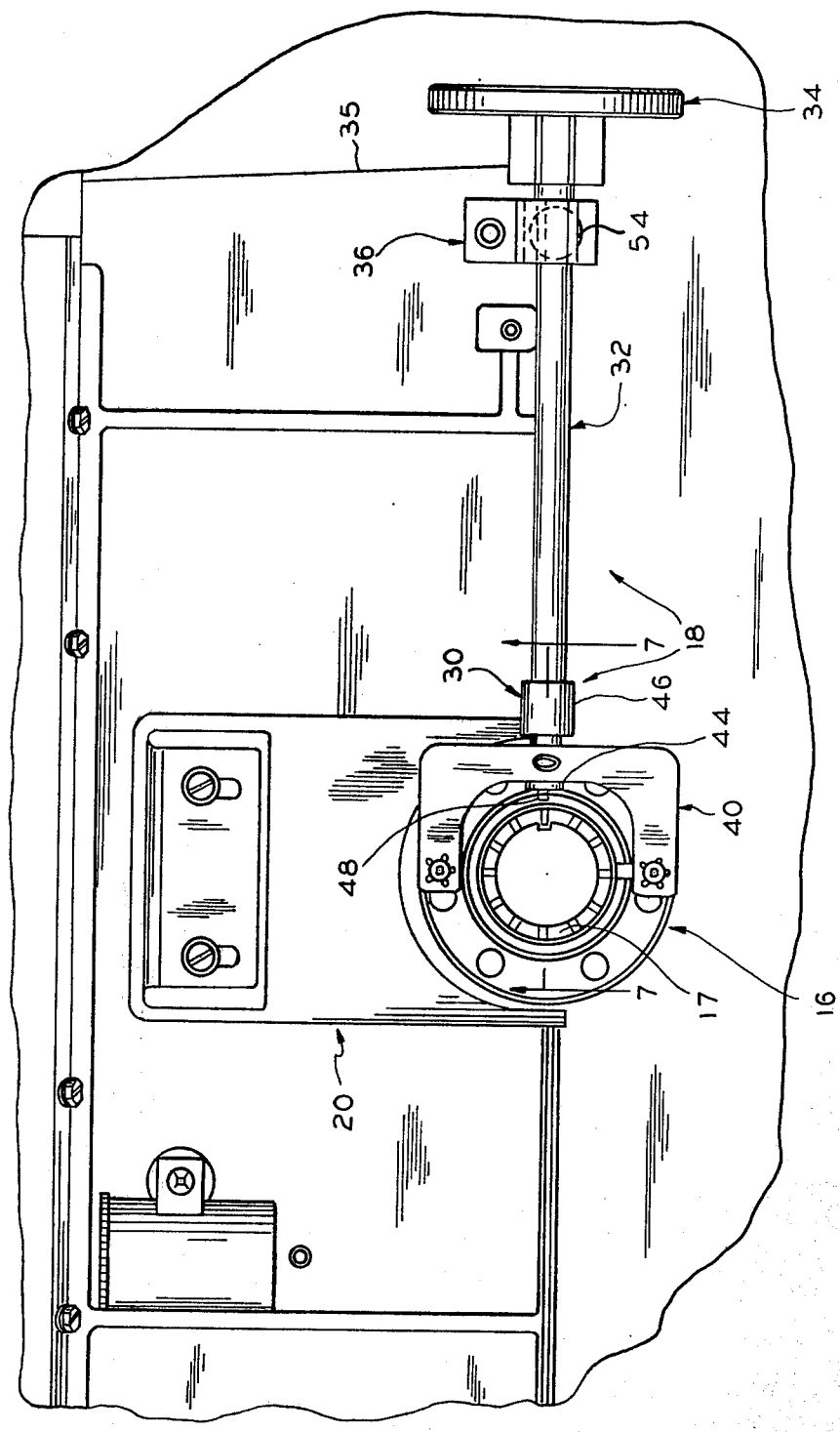
FIG. 6 is a top plan view of the image focusing apparatus of FIG. 3.

As seen in FIGS. 1 and 2, a microfiche film reader generally designated by the numeral 12 includes a transparent or glass plate 14 under which a sheet of microfiche film is placed, and a lens holding or housing apparatus 16 (FIG. 2) which contacts the upper surface of glass plate 14. A lens 17 (FIG. 6) disposed in the lens holding apparatus 16 magnifies an image on a relatively small portion of the film, and a light source located in reader 12 (FIG. 2) beneath glass plate 14 projects the image on to a screen 15. Image focusing apparatus 18 (FIGS. 3 and 6), adjacent lens holding apparatus 16, enables the operator to adjust the lens 17 vertically to focus the image on screen 15.

Lens holding apparatus 16 (FIGS. 3 and 7) generally includes a yoke 20 which is secured to the reader 12, a ring 22 which is pivotally mounted to yoke 20 at ring pivots 24, and a lens-holding cylinder 26 which is pivotally mounted on ring 22 at cone pivots 28. The ring pivots 24 are disposed approximately 90 degrees from the cone pivots 28, creating a universal or gimbal mount for cylinder 26, thus enabling cylinder 26 to rotate slightly in the forward, backward, and side-to-side directions, maintaining virtually complete contact with the surface of glass plate 14 at all times, regardless of the attitude of or irregularities in the glass plate with respect to the horizontal plane defined generally by the top surface of the glass plate.

Image focusing apparatus 18 (FIGS. 3 and 7) includes, generally, a rotating lens adjusting assembly 30 which is mounted on lens-holding cylinder 26 and a shaft 32 which is slidably attached to lens adjusting assembly 30. A knob 34 is attached to the end of shaft 32 opposite lens adjusting assembly 30 for manual rotation of shaft 32, as will be explained. The shaft 32 is supported at bearing surface 54 by a shaft holder 36, the shaft holder 36 being attached to the frame 35 of reader 12.

An indentation 37 (FIG. 8) having sidewalls 38 is provided in the top rim of lens-holding cylinder 26. On the bottom surface of indentation 37 is a platform 39. Lens adjusting assembly 30 (FIGS. 4 and 7) includes a cylindrical mid-section 42, which is adapted to be seated and rotated in indentation 37 and is held in place by platform 39, sidewalls 38, and spring means 40. Spring means 40 also functions to increase the friction between lens adjusting assembly 30 and platform 39, to prevent assembly 30 from turning under the influence of machine vibrations and the like.

One end of mid-section 42 of lens adjusting assembly 30 is provided with a shoulder 44 which faces the interior of lens holding cylinder 26. A finger 48 is attached to shoulder 44 and extends a small distance into lens-holding cylinder 26 to engage the upper rim of the lens (not shown). Finger 48 is disposed eccentrically, or off-center on shoulder 44, so that finger 48 moves in a circular path when lens adjusting assembly 30 is rotated. The vertical component of the circular motion of finger 48 moves the lens up or down, thereby providing means to properly focus the image cast on screen 15.

The end of mid-section 42 opposite shoulder 44 includes a barrel 46, which has a larger output diameter than mid-section 42. A side wall 47 (FIG. 4) of barrel 46, and shoulder 44 act in combination to hold lens adjusting assembly 30 against lateral movement in indentation 37.

A socket 50 (FIGS. 4, 5) is provided in barrel 46 of assembly 30 and extends virtually the entire length of barrel 46 (FIG. 4). Key slots 52 are provided in socket 50, and extend along the entire length of socket 50.

End portion 56 of shaft 32 (FIG. 3) has a rod 58 extending axially from the end thereof, which rod is thinner in diameter than shaft 32. Rod 58 terminates with a partially-spherical end 60 and keys 62 extend radially from the partially-spherical end (FIGS. 3, 7). The radius of partially-spherical end 60 is larger than the radius of rod 58. Partially-spherical end 60 of rod 58 (FIG. 7) slidably fits into socket 50, and keys 62 slidably fit into key slots 52, thus permitting shaft 32 to move axially to a limited degree relative to lens adjusting assembly 30, while at the same time maintaining a rotative connection between the two parts.

In operation, the operator turns the knob 34, which turns the shaft 32, rod 58, partially-spherical end 60 and the keys 62. The force of the keys 62 on key slots 52 turns the lens adjusting assembly 30. The vertical component of the rotating movement of finger 48 moves the lens vertically, which enables the operator to focus the image on the screen. If the glass plate is later moved, the attitude of the lens holding apparatus may change, changing the relative angular position of assembly 30 relative to the shaft 32. The lens may be still adjusted, however, because of the flexibility of end portion 56 in cavity 50 and key slots 52 of barrel 46. The lateral or axial distance between shaft 32 and lens adjusting assembly 30 may also be changed to the extent of the length of socket 50 without changing the ability of the over-all lens adjusting mechanism to properly focus the lens. Because of the novel configuration of end portion 56, socket 50 and key slots 52 in barrel 46, shaft 32 is simultaneously pivotally and slidably connected to barrel 46.

The many advantages of this invention are now self-apparent. First, inexpensive microfiche readers, including the lens adjusting mechanism, are usually comprised of plastic components, which do not "give" under compressive or tensile stresses as do equivalent parts composed of metal. The present structure provides a flexible lens adjusting and focusing mechanism which can readily compensate for any changes in the attitude of the lens housing, while at the same time maintaining the lens adjusting function of the plastic parts. Second, the unit may be easily assembled without the use of sophisticated tooling. Third, the lens may be adjusted vertically to focus the image on the screen regardless of the angular disposition of the lens with respect to the lens adjusting shaft. Fourth, the lens adjusting apparatus does not impair the movement of the lens holding apparatus.

While the principles of the present invention have been described above in connection with specific apparatus and applications, it is to be understood that this description is made only by way of example, and not as a limitation on the scope of the invention.

I claim:

1. In an optical system having a lens, an image focusing apparatus for said optical system comprising:
   lens holding means mounted to a frame for universal pivotal movement relative to said frame;
   rotating lens adjusting means associated with said lens holding means for adjusting said lens, said rotating lens adjusting means including a barrel having a socket disposed therein and key slot means disposed along the length of said socket;
   shaft means associated with said rotating lens adjusting means for turning and controlling said rotating lens adjusting means, said shaft means including a partially-spherical portion on one end thereof for slidably fitting into said socket of said rotating lens adjusting means and further including key means for slidably fitting into said key slot means, said key means extending from said partially-spherical portion in a radial direction with respect to said shaft means; and
   means associated with said shaft means for movably securing a part of said shaft means to said frame;
   whereby said shaft means is slidably and pivotally connected to said rotating means and whereby said rotating lens adjusting means may be turned and controlled by said shaft means to adjust said lens regardless of the angular disposition of said lens holding means and said rotating lens adjusting means with respect to said shaft means.

2. The image focusing apparatus of claim 1 wherein said shaft means further includes a rod portion connecting said partially-spherical portion to the remainder of said shaft means, said rod portion having a smaller diameter than said shaft means and having a smaller radius than said partially-spherical portion.

3. The image focusing apparatus of claim 2 wherein:
said lens holding means includes:
a lens-holding cylinder having an indentation disposed in the top thereof; and
said rotating lens adjusting means further includes a round mid-section operatively connected to said indentation, a shoulder slightly larger in diameter than said mid-section adjacent said mid-section, finger means extending outward axially from said shoulder, said finger means being disposed off-center on said shoulder, and spring means operatively connected to said mid-section for holding said lens adjusting means in said indentation.

4. The image focusing apparatus of claim 3 wherein:
said shaft means includes knob means on the end of said shaft opposite said rotating lens adjusting means for manual rotation of said shaft.

5. In a microfiche film reader having a lens, a film-holding transparent plate, and a universally mounted lens holding apparatus adapted to rest on said transparent plate, whereby said lens is movably supported by said lens holding apparatus and said lens holding apparatus moves in response to changes in the angular attitude of said transparent plate, image focusing apparatus for said reader comprising:

rotating lens adjusting means associated with said lens holding apparatus for adjusting said lens, said rotating lens adjusting means including a barrel having a socket disposed therein, and key slot means disposed along the length of said socket;

shaft means associated with said rotating lens adjusting means for turning and controlling said rotating lens adjusting means said shaft means including a partially-spherical portion on one end thereof for slidably fitting into said socket of said rotating lens adjusting means and further including key means for slidably fitting into said key slot means, said key means extending from said partially-spherical end in a radial direction with respect to said shaft means; and means associated with said shaft means for movably securing a part of said shaft means to said reader;

whereby said shaft means is slidably and pivotally connected to said rotating lens adjusting means and whereby said rotating lens adjusting means may be turned and controlled by said shaft means to adjust said lens in said reader regardless of the angular disposition of said lens holding means and said rotating lens adjusting means with respect to said shaft means.

6. The image focusing apparatus of claim 5 wherein said shaft means further includes a rod portion connecting said partially-spherical portion to the remainder of said shaft means, said rod portion having a smaller diameter than said shaft means and having a smaller radius than said partially-spherical portion.

7. The image focusing apparatus of claim 6 wherein:
said lens holding means includes a lens-holding cylinder;
an indentation disposed in the top of said lens-holding cylinder; and
said rotating lens adjusting means further includes a round mid-section operatively connected to said indentation, a shoulder slightly larger in diameter than said mid-section adjacent said mid-section, finger means extending outward axially from said shoulder, said finger means being disposed off-center on said shoulder, and spring means operatively connected to said mid-section for holding said rotating lens adjusting means in said indentation.

8. The image focusing apparatus of claim 7 wherein:
said shaft means includes knob means on the end of said shaft opposite said rotating lens adjusting means.

* * * * *